(12) United States Patent
Jung et al.

(10) Patent No.: US 7,680,840 B2
(45) Date of Patent: Mar. 16, 2010

(54) IMAGE PROCESSING SYSTEM AND METHOD OF PROCESSING IMAGE

(75) Inventors: Min-woo Jung, Seoul (KR); Chun-un Kang, Seoul (KR); Ki-won Kwak, Seoul (KR); Hee-min Kwon, Seoul (KR); Chang-nam Chu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 973 days.

(21) Appl. No.: 11/098,465

(22) Filed: Apr. 5, 2005

(65) Prior Publication Data
US 2005/0223411 A1 Oct. 6, 2005

(30) Foreign Application Priority Data
Apr. 6, 2004 (KR) .................. 10-2004-0023379

(51) Int. Cl.
G06F 12/00 (2006.01)
G06F 17/30 (2006.01)

(52) U.S. Cl. .................. 707/204; 707/205; 715/760; 715/762

(58) Field of Classification Search ............. 707/1–10, 707/100–104.1, 200–206; 345/650, 661, 345/676; 715/513, 716–720, 746, 760, 762; 715/234; 386/95
See application file for complete search history.

(56) References Cited

U.S. PATENT DOCUMENTS 6,182,094 B1 * 1/2001 Humpleman et al. ........ 715/513
6,230,173 B1 * 5/2001 Ferrel et al. ................. 715/513
6,442,755 B1 * 8/2002 Lemmons et al. ............ 725/47
2004/0040036 A1 * 2/2004 An .............................. 725/39

FOREIGN PATENT DOCUMENTS

| EP | 1 111 926 A2 | 6/2001 |
| JP | 2000-188727 A | 7/2000 |
| JP | 2001-186497 A | 7/2001 |
| KR | 1999-0038731 A | 6/1999 |
| KR | 2001-0053442 A | 6/2001 |
| WO | 03/096349 A1 | 11/2003 |
| WO | WO 03/096695 A1 | 11/2003 |

OTHER PUBLICATIONS

Arias et al., Content-based search and annotations in multimedia digital libraries, Sep. 8-12, 2003, IEEE, 109-116.*
Khan et al., QoS-based synchronization of multimedia document streams, Dec. 11-13, 2002, IEEE, 320-327.*

* cited by examiner

Primary Examiner—Jean B Fleurantin
(74) Attorney, Agent, or Firm—Sughrue Mion, PLLC (57) ABSTRACT

An image processing system and a method of the same conveniently transmit meta data without using an additional transmission apparatus. The image processing apparatus includes a meta data extraction unit extracting meta data, a markup language conversion unit converting the meta data into a markup language document, and a document transmission unit transmitting the markup language document to a predetermined image output apparatus.

17 Claims, 7 Drawing Sheets

```
        <DTV>
410  ── <TamplateID>3</TamplateID>
420  ── <Title left="100" top="100" width="900" height="200">
430  ── Lord of the Rings : The Return of the King</Title>
        <ActorList left="100" top="500" width="900" height=580">
        David Wenham, Sean Astin, Elijah Wood, Ian McKellen, ···</ActorList>
        <Desc left="100" top="600" width="900" height="800">
        The greatest masterpiece of the first century, a final war begins.
        The real king of Gondor has returned!  Sauron' s forces have
        laid siege to the capital of Gondor, the last fortress of men, and
        Aragorn has to determine succession to the throne and
        reconstruct the capital of Gondor.  The future of Middle-earth
        depends on Aragorn. </Desc>
        </DTV>
```

IMAGE PROCESSING SYSTEM AND METHOD OF PROCESSING IMAGE

CROSS-REFERENCE TO RELATED APPLICATION

This application claims priority from Korean Patent Application No. 10-2004-0023379 filed on Apr. 6, 2004 in the Korean Intellectual Property Office, the disclosure of which is incorporated herein by reference in its entirety.

BACKGROUND OF THE INVENTION

1. Field of the Invention

The present invention relates to an image processing system and a method of the same, and more particularly, to an image processing system and a method of the same for conveniently transmitting meta data without using an additional transmission apparatus.

2. Description of the Related Art

In general, a high definition multimedia interface (HDMI) is formed by integrating RGB, Y, and Cb/Cr channels and an audio channel into one channel, and combines high-definition video signals and multi-channel audio signals into a single digital interface having a bandwidth of over 5 Gbps.

The HDMI is formed of three independent communication channels including a transition minimized differential signaling (TMDS) channel, a display data channel (DDC), and a consumer electronics control (CEC) channel. In addition, A/V data, information on an apparatus, and control commands may be transmitted and received through the HDMI.

The TMDS channel provides a data transmission speed of less than 5 Gbps and is in charge of transmitting and receiving video signals and audio signals.

The DDC is a data communication standard between an output apparatus and a monitor, defined by VESA, which is an international standards institute. When booting a system, the output apparatus realizes an optimum image by referring to information about the monitor.

In general, the output apparatus transmits optimum video signals and audio signals with reference to enhanced extended display identification data (E-EDID) of the monitor. The CEC is an additional protocol for performing high-level control functions in the HDMI, and may be used at a low transmission speed and a low level of memory.

Every apparatus has a physical address under an HDMI environment; however, the CEC uses a logical address, and thus determines a device type by using logical information while changing the physical address into the logical address.

Figure 1A:
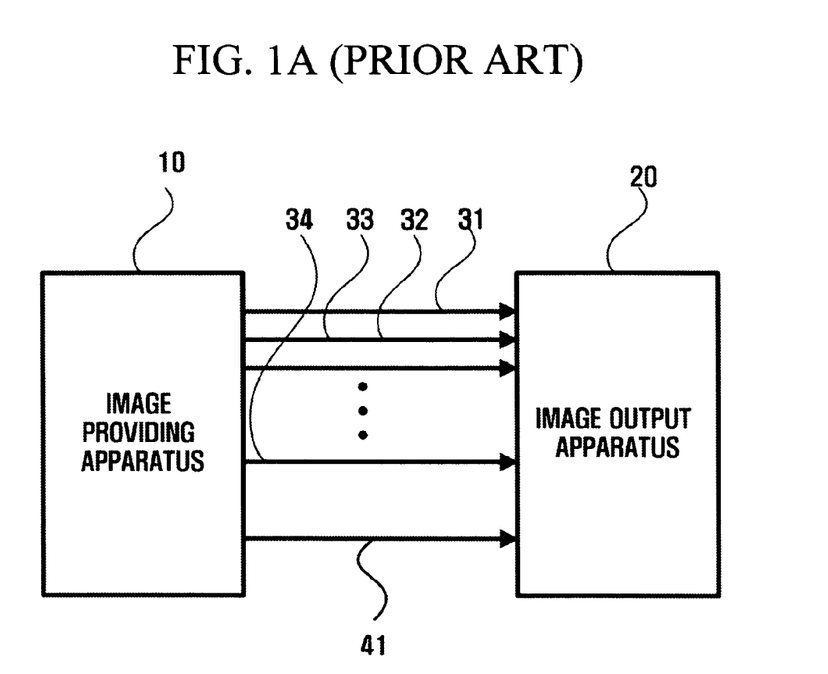
FIG. 1A is a block diagram of a conventional image system.

Referring to FIG. 1A, a plurality of video cables 31, 32, 33, and 34 and an audio cable 41 are required to transmit moving picture signals from an image providing apparatus 10, such as a DVD player or a set top box (STB), to an image output apparatus 20.

Figure 1B:
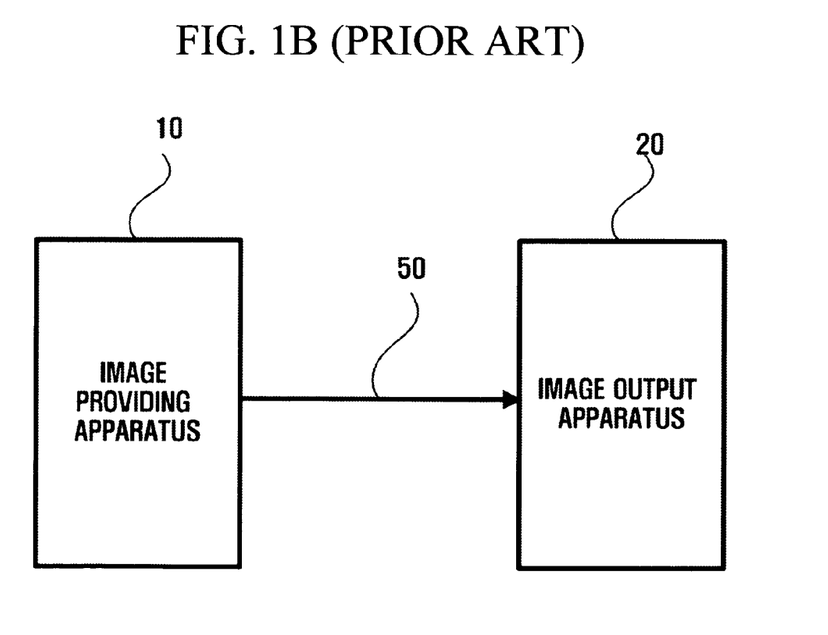
FIG. 1B is a block diagram of a conventional image system to which a high definition multimedia interface (HDMI) is applied.

When using the HDMI, a single cable 50 may transmit moving picture signals from an image providing apparatus 10 to an image output apparatus 20, as shown in FIG. 1B.

The single cable 50 may be logically divided into a TMDS channel, a DDC channel, and a CEC channel.

In addition, the TMDS channel, the DDC channel, and the CEC channel may be logically divided into more than one channel.

Figure 2:
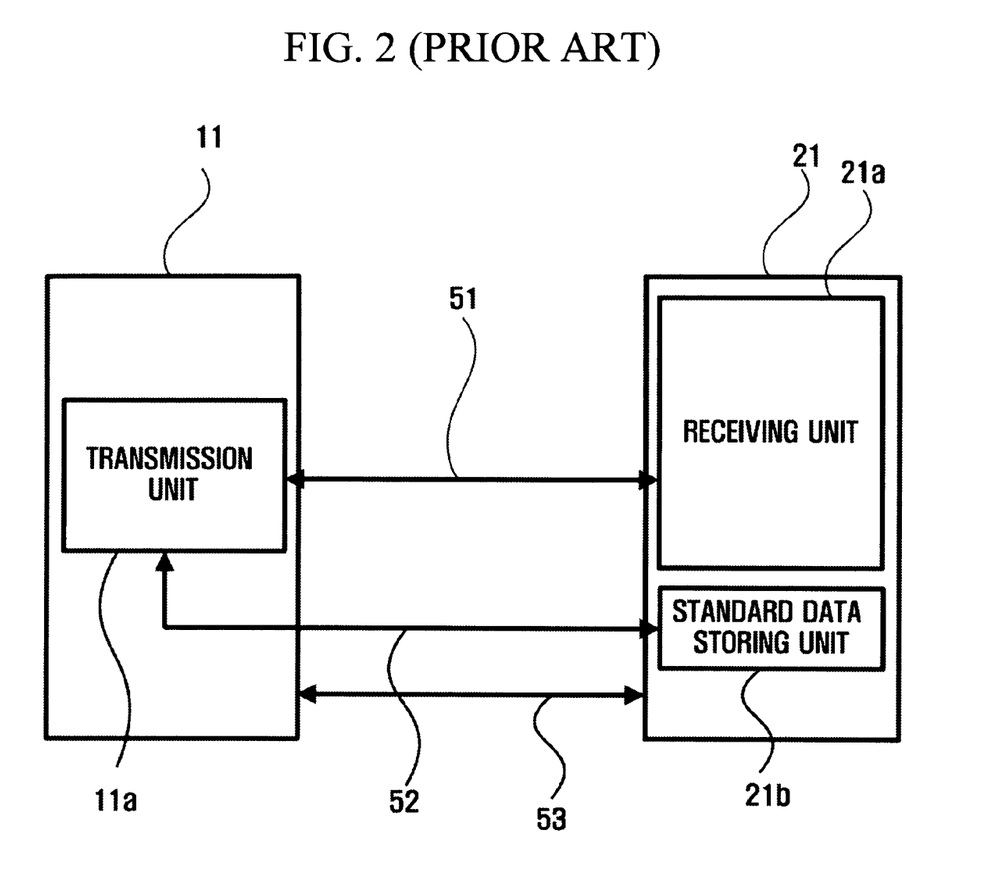
FIG. 2 is a block diagram of a conventional image processing system using an HDMI.

Referring to FIG. 2, an image processing system using an HDMI includes an HDMI source unit 11, which is included in an image providing apparatus 10 for transmitting moving picture signals to an image output apparatus 20, and an HDMI sink unit 21, which is included in the image output apparatus 20 for receiving the moving picture signals.

The HDMI source unit 11 includes a transmission unit 11a, which transmits video signals and audio signals included in the moving picture signals to the HDMI sink unit 21 through the TMDS channel 51.

In addition, the HDMI sink unit 21 includes a receiving unit 21a, which receives the video signals and the audio signals through the TMDS channel 51, and a standard data storing unit 21b, which stores standard data of the image output apparatus 20.

In this case, the HDMI source unit 11 searches standard data stored in the standard data storing unit 21b and transmits the video signals and the audio signals optimized to the image output apparatus 20 through a DDC channel 52.

Furthermore, the HDMI source unit 11 transmits a control command for controlling the image output apparatus 20 through a CEC channel 53.

In such an image processing system using the HDMI, when meta data included in the moving picture signals is converted into a predetermined markup language document and transmitted to the image output apparatus 20, the CEC channel is used.

However, the CEC channel cannot accommodate a large amount of data, such as image data, in the markup language document and transmit the document to the image output apparatus 20. Thus an additional transmission device, such as an IEEE1394, should be added.

Korean Laid-open Patent No. 2001-0053442 discloses a method of guiding programs using a markup language, which comprises interpreting an XML document received through a bi-directional television system and changing a user interface by generating corresponding display elements. In this case, the display elements of the user interface are included in the XML document, resulting in an increase in the size of the XML document. Accordingly, it is difficult to transmit the XML document through the CEC channel.

SUMMARY OF THE INVENTION

The present invention provides an image processing system and a method for conveniently transmitting meta data in a high definition multimedia interface (HDMI) based system.

The above stated object as well as other objects, features and advantages, of the present invention will become clear to those skilled in the art upon review of the following description, the attached drawings and appended claims.

According to an aspect of the present invention, there is provided an image processing apparatus comprising a meta data extraction unit for extracting meta data, a markup language conversion unit for converting the meta data into a markup language document, and a document transmission unit for transmitting the markup language document to an image output apparatus.

The image processing apparatus may further include a moving picture transmission unit transmitting moving picture signals to the image output apparatus.

In addition, the image processing apparatus may further include a first memory unit, storing user interface configuration data, stored in the image output apparatus according to fields of the meta data.

The user interface configuration data may include at least one of a corresponding user interface ID and location data for overlaying the meta data on the user interface.

The markup language document may include at least one of the user interface ID, the location data, and the meta data.

The document transmission unit may transmit the markup language document to the image output apparatus through a consumer electronic control (CEC) channel of a high definition multimedia interface (HDMI).

The markup language may be at least one of XML, HTML, SGML, and DHTML.

According to another aspect of the present invention, there is provided an image processing apparatus including a document receiving unit receiving a markup language document, a second memory unit storing a user interface corresponding to the markup language document, and a first control unit overlaying meta data included in the markup language document on the user interface.

The image processing apparatus may further include a moving picture receiving unit receiving moving picture signals from a predetermined image providing apparatus.

The document receiving unit may receive the markup language document from the image providing apparatus through a CEC channel of an HDMI.

The document receiving unit may include a parser parsing the markup language document.

The parsed markup language document may include at least one of a corresponding user interface ID, the location data of the meta data in the user interface, and the meta data.

The first control unit may extract the user interface corresponding to the user interface ID from the second memory unit, and may overlay the meta data on the extracted user interface according to the location data.

The image processing apparatus may further include a second control unit overlaying the user interface, on which the meta data is overlaid, on the moving picture signals received by the moving picture receiving unit and outputting the user interface.

According to still another aspect of the present invention, there is provided a method of processing an image, the method including extracting meta data, converting the meta data into a markup language document, and transmitting the markup language document to a predetermined image output apparatus.

The method of processing an image may further include transmitting moving picture signals to the image output apparatus.

In the converting of the meta data, the meta data may be converted into the markup language document based on the user interface configuration data stored according to fields of the meta data.

The user interface configuration data may include at least one of a corresponding user interface ID and location data for overlaying the meta data on the user interface.

The markup language document may include at least one of the user interface ID, the location data, and the meta data.

In transmitting the markup language document, the document transmission unit may transmit the markup language document to the image output apparatus through a consumer electronic control (CEC) channel of a high definition multimedia interface (HDMI).

According to a further aspect of the present invention, there is provided a method of processing an image, the method including receiving a markup language document, extracting a user interface corresponding to the received markup language document, and overlaying the meta data corresponding to the markup language document on the user interface.

The method of processing an image may further include receiving moving picture signals from the image providing apparatus.

The markup language document may be received from the image providing apparatus through a consumer electronic control (CEC) channel of a high definition multimedia interface (HDMI).

The markup language document may include at least one of the user interface ID, the location data, and the meta data.

The receiving of the markup language document may include parsing the markup language document.

The extracting of the user interface may be performed using the user interface ID included in the markup language document.

The overlaying may be performed using the location data included in the markup language document.

The method of processing an image may further include overlaying the user interface having the meta data overlaid thereon on the moving picture signals.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
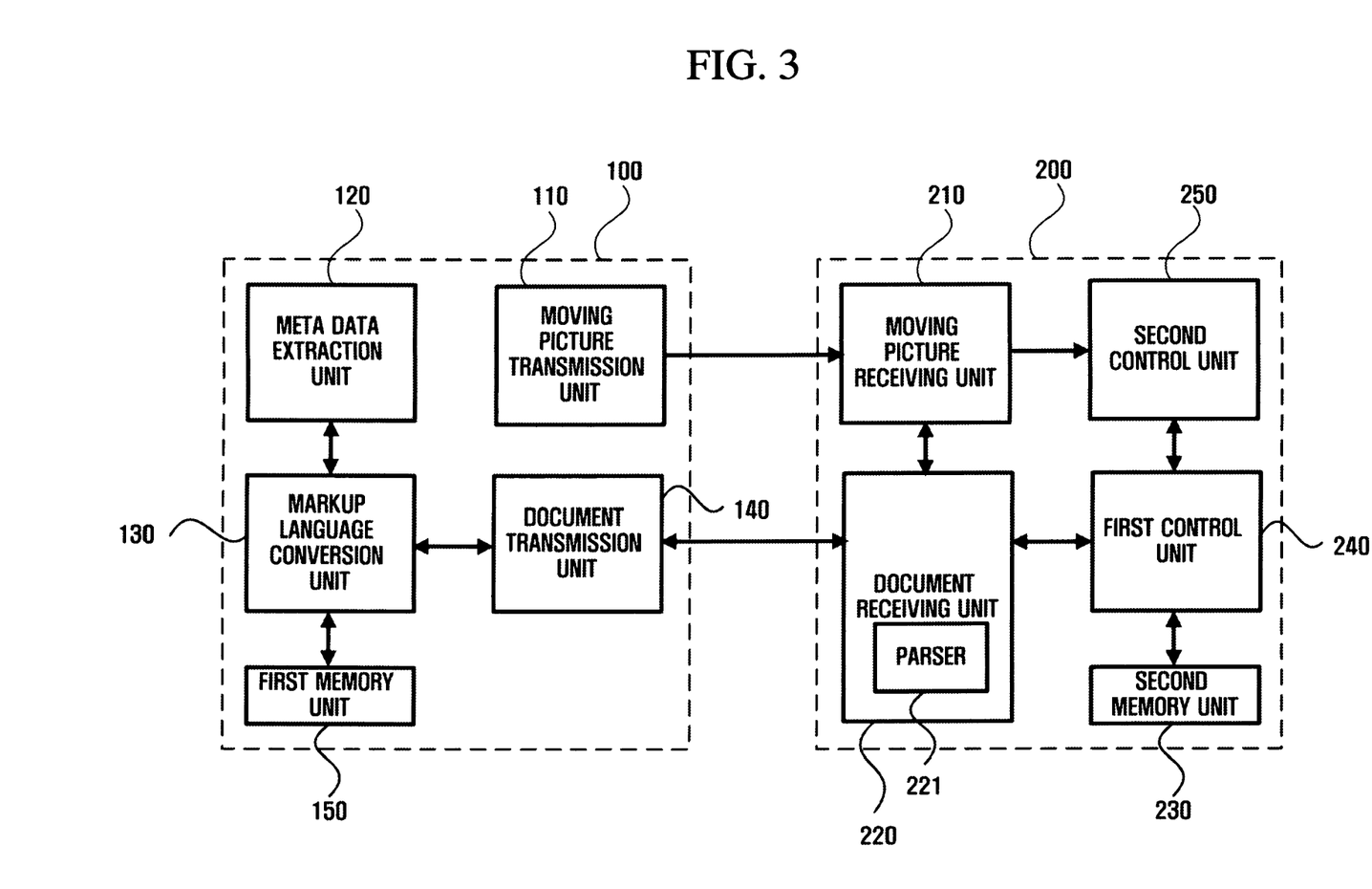
FIG. 3 is a block diagram of an image processing system according to an embodiment of the present invention.

Referring to FIG. 3, an image processing system according to an embodiment of the present invention includes an image providing apparatus 100 for converting meta data into a markup language document and an image output apparatus 200 for overlaying meta data corresponding to the markup language document on a user interface corresponding to the markup language document and outputting the meta data.

In this case, the image providing apparatus 100 includes a moving picture transmission unit 110 for transmitting moving picture signals to the image output apparatus 200, a meta data extraction unit 120 for extracting meta data from the moving picture signals, a markup language conversion unit 130 for converting the meta data into a markup language document, and a document transmission unit 140 for transmitting the markup language document to the image output apparatus 200.

In an embodiment of the present invention, an XML document is used as the markup language document.

In addition, other examples of the markup language document include an HTML document, an SGML document, and a DHTML document, as well as the XML document.

The meta data may include meta data included in a control signal, which is input through a remote controller by a user, as well as meta data included in moving picture signals.

The image providing apparatus 100 further includes a first memory unit 150 for storing user interface configuration data, which is stored in the image output apparatus 200 and is divided based on the fields of the meta data.

Here, the user interface configuration data may include the fields of the meta data that can be overlaid on a predetermined user interface, for example, a title, actors and actresses, and a description of a program.

Accordingly, the user interface configuration data stored in the first memory unit 150 may include a user interface ID corresponding to the fields of the extracted meta data and location data of the fields in a corresponding user interface.

Figure 4:
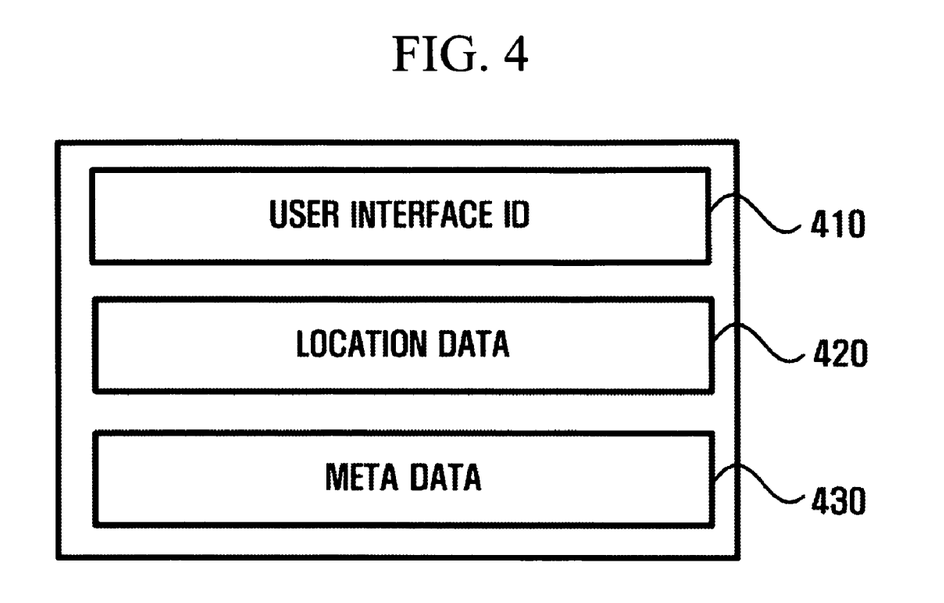
FIG. 4 illustrates a structure of a markup language document according to an embodiment of the present invention.

Referring to FIG. 4, the markup language document generated by the markup language conversion unit 130 includes the user interface ID 410, the location data 420, and the corresponding meta data 430 corresponding to the fields of the meta data extracted from the first memory unit 150.

The document transmission unit 140 transmits the markup language document through the CEC channel of the HDMI.

In this case, the CEC channel is suitable for transmitting the markup language document, because the CEC channel is used at a low transmission speed and a low level of memory.

The image output apparatus 200 includes a moving picture receiving unit 210 for receiving the moving picture signals from the image providing apparatus 100, a document receiving unit 220 for receiving the markup language document, a second memory unit 230 for storing a user interface corresponding to the markup language document, and a first control unit 240. In this case, the first control unit 240 extracts the user interface corresponding to the received markup language document from the second memory unit 230 and overlays the meta data corresponding to the markup language document on the extracted user interface.

In addition, the image output apparatus 200 further includes a second control unit 250 for overlaying the user interface, on which the meta data is overlaid, on the received moving picture signals and for outputting the user interface.

In this case, the first control unit 240 and the second control unit 250 may be formed of one chip or separate chips.

The document receiving unit 200 includes a parser 221 for parsing the markup language document. The first control unit 240 extracts the user interface corresponding to the user interface ID 410, which is obtained by a parsing operation, from the second memory unit 230.

In addition, the first control unit 240 outputs the extracted user interface after overlaying the meta data based on the location data, which is obtained by the parsing operation.

An operation of an image processing system according to an embodiment of the present invention will now be described.

Figure 5:
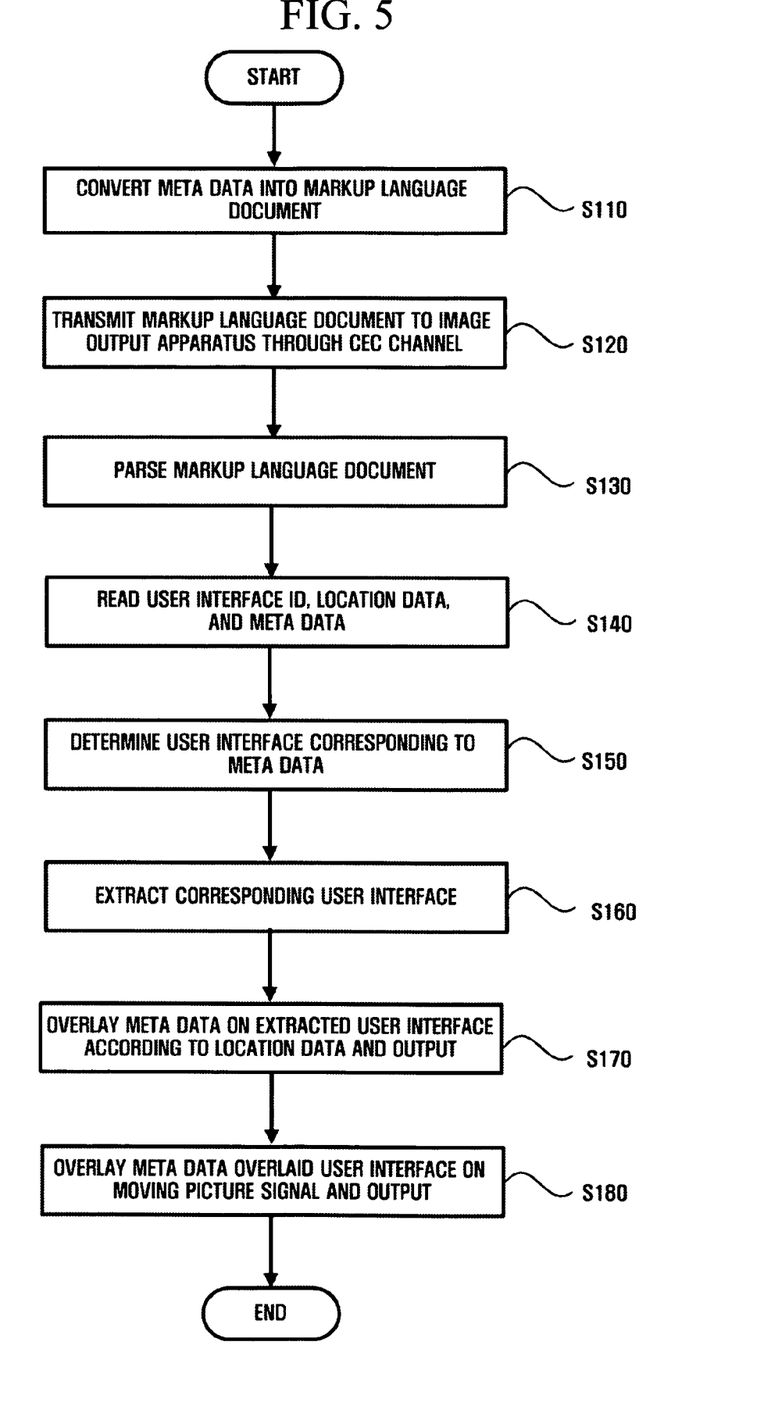
FIG. 5 is a flowchart illustrating a method of processing an image according to an embodiment of the present invention.

Referring to FIG. 5, meta data obtained by a meta data extraction unit 120 is converted into a markup language document by a markup language conversion unit 130, in operation S110.

The meta data may include, for example, moving picture signals received through a satellite, a cable, or an A/V network or reproduced by a CD player or a DVD player, control signals input through a remote controller by a user, and short messages from predetermined users.

In this case, the markup language conversion unit 130 generates the markup language document by using location information on meta data of a user interface ID and of the user interface.

However, where meta data includes user interface configuration data, the markup language conversion unit 130 extracts only the user interface ID from the first memory unit 150 and converts the extracted user interface ID into a markup language document.

In the description of the present invention, the meta data is converted into an XML document.

A document transmission unit 140 transmits the markup language document generated by the markup language conversion unit 130 to the image output apparatus 200 through the CEC channel of the HDMI, in operation S120.

In addition, a moving picture transmission unit 110 transmits the moving picture signals to the image output apparatus 200 through the TMDS channel of the HDMI.

In this case, the markup language document transmitted to the image output apparatus 200 may be converted into a CEC protocol message in the document transmission unit 140.

The structure of the CEC protocol message is shown in Table 1.

TABLE 1

| Start |
| Header Block |
| Data Block |

In this case, the CEC protocol message is formed of a Start denoting the start of the message, a Header Block denoting a source address and a target address, and a Data Block including transmitted data.

The Header Block includes information on the data size included in the Data Block, and the Data Block includes the markup language document.

In addition, the structure of the Header Block and the Data Block is shown in Table 2.

TABLE 2

| Data Bit | EOM | ACK |

Here, a Data Bit includes real data, EOM denotes the end of a message, and ACK separates the Header Block from the Data Block, which are included in the Data Bit.

In other words, the markup language document may be determined from the data included in the Data Bit by using ACK.

A document receiving unit 220 receives the markup language document transmitted to the image output apparatus 200, and the parser 221 parses the markup language document, in operation S130.

Based on the parsing result, the first control unit 240 interprets the user interface ID 410, the location data 420, and the meta data 430 corresponding to the markup language document, in operation S140.

Based on the interpretation result, the first control unit 240 determines a user interface corresponding to the user interface ID 410, in operation S150, and extracts the corresponding user interface from the second memory 230, in operation S160.

The first control unit 240 overlays the meta data on the extracted user interface at a location corresponding to the location data 420 and outputs the meta data, in operation S170.

In addition, a second control unit 250 overlays the user interface, on which the meta data is overlaid, on the moving picture signals and outputs the moving picture signals, in operation S180.

Figure 6:
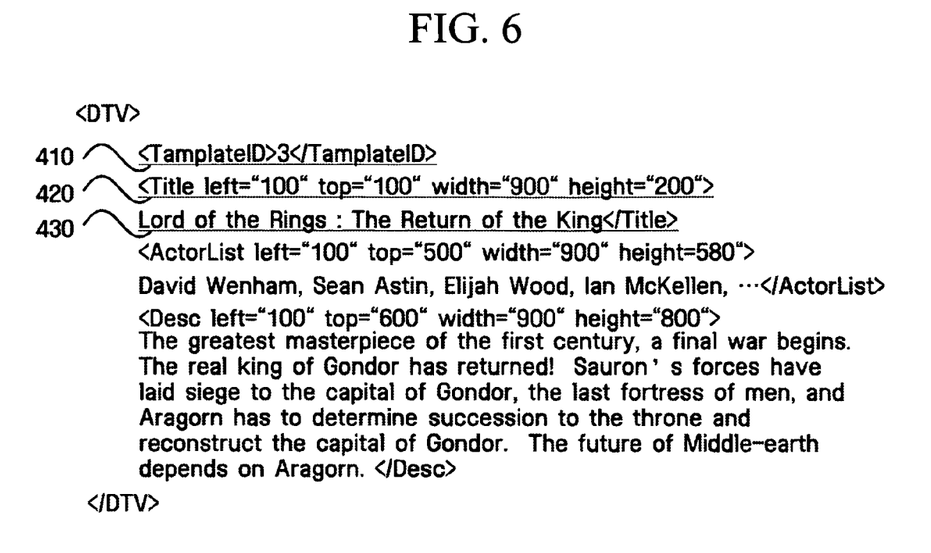
FIG. 6 illustrates a markup language document according to an embodiment of the present invention.

In other words, when the parser 221 parses the markup language document, the user interface ID 410, the location data 420, and the meta data 430 as shown in FIG. 6 can be obtained.

Figure 7:
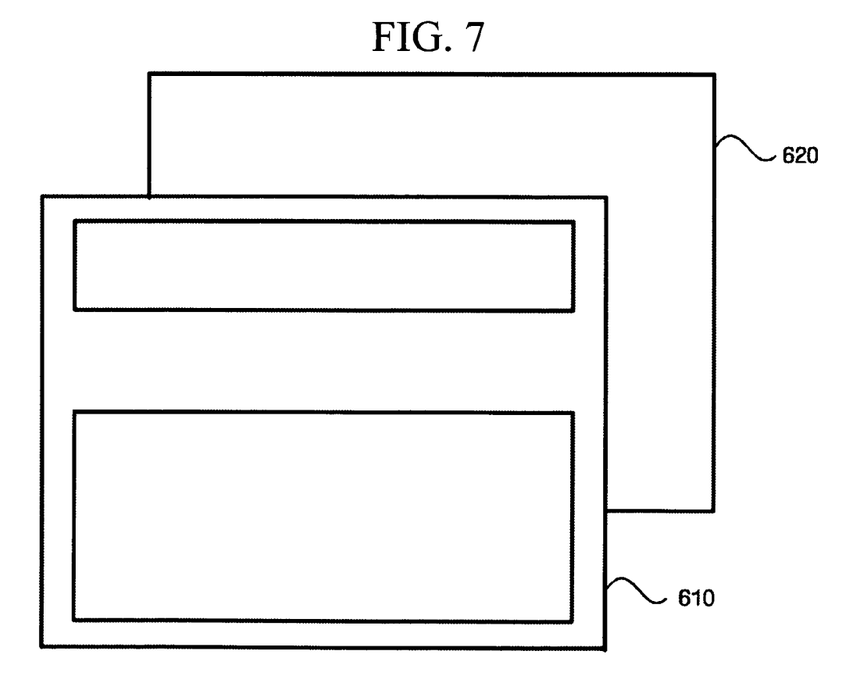
FIG. 7 illustrates a user interface according to an embodiment of the present invention.

In this case, when a user interface 610 corresponding to the user interface ID 410 is extracted from the second memory unit 230 as shown in FIG. 7, the meta data 430 is overlaid on the user interface 610 according to the location data 420.

In addition, the user interface 610, on which the meta data 430 is overlaid, is overlaid on a moving picture image 620 and outputted.

Figure 8:
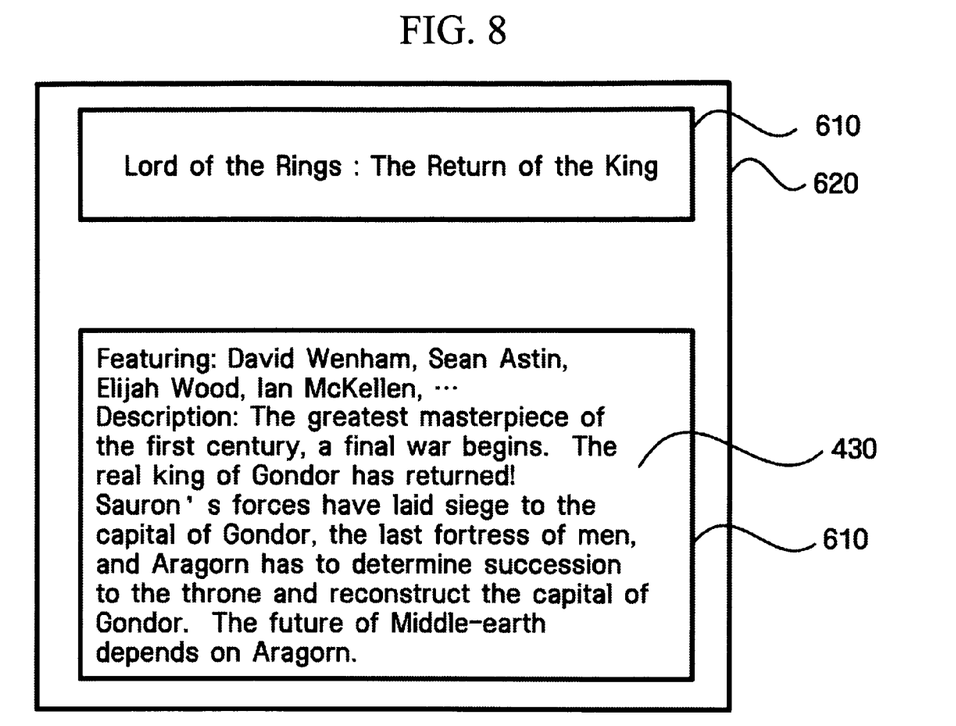
FIG. 8 illustrates meta data overlaid on a user interface according to an embodiment of the present invention.

Accordingly, as shown in FIG. 8, a user may receive the user interface 610 and the meta data 430 overlaid on the moving picture image 620.

According to the present invention, meta data may be displayed through a user interface without using an additional transmission apparatus. Thus the configuration of an image processing system is simplified and cost is reduced.

While the image processing system according to the present invention and the method thereof have been shown and described with reference to exemplary embodiments thereof, it will be understood by those skilled in the art that various changes in form and details may be made therein without departing from the spirit and scope of the present invention as defined by the following claims.

What is claimed is:

1. An image processing apparatus comprising:
   a meta data extraction unit that extracts meta data from a moving picture signal;
   a markup language conversion unit that converts the meta data into a markup language document;
   a document transmission unit that transmits the markup language document to a predetermined image output apparatus through a first communication channel;
   a moving picture transmission unit that transmits the moving picture signal to the predetermined image output apparatus through a second communication channel; and
   a memory unit that stores user interface configuration data, for a user interface stored in the image output apparatus according to one or more fields of the meta data,
   wherein, at least one of the meta data extraction unit, the markup language conversion unit, the document transmission unit, and the moving picture transmission unit, is a processor, and
   wherein the user interface configuration data includes at least one of a user interface ID corresponding to the user interface, and location data for overlaying the meta data on the user interface.

2. The image processing apparatus of claim 1, wherein the markup language document includes at least one of the user interface ID, the location data, and the meta data.

3. The image processing apparatus of claim 2, wherein the first communication channel is a transition minimized differential signaling (TMDS) channel transmitted of a high definition multimedia interface (HDMI), and wherein the second communication channel is a consumer electronic control (CEC) channel of the HDMI.

4. The image processing apparatus of claim 3, wherein the markup language is at least one of XML, HTML, SGML, and DHTML.

5. An image processing apparatus comprising:
   a document receiving unit that receives a markup language document, including meta data extracted from a moving picture signal, from a predetermined image providing apparatus, through a first communication channel;
   a moving picture receiving unit that receives the moving picture signal from the predetermined image providing apparatus through a second communication channel;
   a memory unit that stores a user interface corresponding to the markup language document; and
   a first control unit that overlays the meta data included in the markup language document on the user interface,
   wherein, at least one of, the document receiving unit, the moving picture receiving unit, the memory unit, and the first control unit, is a processor,
   wherein the document receiving unit includes a parser that parses the markup language document, and
   wherein the parsed markup language document includes at least one of a user interface ID corresponding to the user interface, location data for overlaying the meta data on the user interface, and the meta data.

6. The image processing apparatus of claim 5, wherein the first communication channel is a transition minimized differential signaling (TMDS) channel transmitted of a high definition multimedia interface (HDMI), and wherein the second communication channel is a consumer electronic control (CEC) channel of the HDMI.

7. The image processing apparatus of claim 6, wherein the first control unit extracts the user interface corresponding to the user interface ID from the second memory unit, and overlays the meta data on the user interface according to the location data.

8. The image processing apparatus of claim 7, further comprising a second control unit that overlays the user interface, on which the meta data is overlaid, on the moving picture signals received by the moving picture receiving unit and that outputs the user interface.

9. A method of processing an image, the method comprising:
   extracting meta data from a moving picture signal;
   converting the meta data into a markup language document;
   transmitting the markup language document to a predetermined image output apparatus through a first communication channel; and
   transmitting the moving picture signal to the image output apparatus through a second communication channel;
   wherein the meta data is converted into the markup language document based on user interface configuration data stored according to one or more fields of the meta data, and
   wherein the user interface configuration data includes at least one of a user interface ID corresponding to a user interface, and location data for overlaying the meta data on the user interface.

10. The method of claim 9, wherein the markup language document includes at least one of the user interface ID, the location data, and the meta data.

11. The method of claim 10, wherein the first communication channel is a transition minimized differential signaling (TMDS) channel transmitted of a high definition multimedia interface (HDMI), and wherein the markup language the second communication channel is a consumer electronic control (CEC) channel of the HDMI.

12. A method of processing an image, the method performed by an image output apparatus, the method comprising:

receiving a markup language document, including meta data extracted from a moving picture signal, from a predetermined image providing apparatus, through a first communication channel;

receiving the moving picture signal from the predetermined image providing apparatus through a second communication channel;

extracting a user interface corresponding to the markup language document; and overlaying meta data corresponding to the markup language document on the user interfaces, wherein the markup language document includes at least one of a user interface ID corresponding to the user interface, location data for overlaying the meta data on the user interface, and the meta data.

13. The method of claim 12, wherein the first communication channel is a transition minimized differential signaling (TMDS) channel transmitted of a high definition multimedia interface (HDMI), and wherein the second communication channel is a consumer electronic control (CEC) channel of the HDMI.

14. The method of claim 13, wherein receiving the markup language document comprises parsing the markup language document.

15. The method of claim 14, wherein the user interface ID included in the markup language document is used to extract the user interface.

16. The method of claim 15, wherein the meta data is overlaid on the user interface according to the location data included in the markup language document.

17. The method of claim 16 further comprising overlaying the user interface having the meta data overlaid thereon on the moving picture signal.

* * * * *